(12) United States Patent
Haefner et al.

(10) Patent No.: US 6,487,898 B1
(45) Date of Patent: *Dec. 3, 2002

(54) ENGINE CYLINDER PRESSURE SENSOR WITH THERMAL COMPENSATION ELEMENT

(75) Inventors: Donald R. Haefner, Troy, MI (US); Dennis R. Zitny, Dearborn, MI (US); David A. Belfi, Royal Oak, MI (US)

(73) Assignee: Eaton Corporation, Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 855 days.

(21) Appl. No.: 08/792,007

(22) Filed: Jan. 28, 1997

(51) Int. Cl.⁷ .............................................. G01M 15/00
(52) U.S. Cl. ....................................................... 73/115
(58) Field of Search ............................... 73/35.12, 115, 73/116, 117.3, 118.1

(56) References Cited

U.S. PATENT DOCUMENTS

| | | | | |
|---|---|---|---|---|
| 2,202,900 A | * | 6/1940 | Draper | 73/35.12 |
| 4,424,705 A | * | 1/1984 | Hattori et al. | 73/35.12 |
| 4,570,097 A | * | 2/1986 | Shukla et al. | 73/115 |
| 4,586,018 A | * | 4/1986 | Bettman | 73/115 |
| 4,620,438 A | * | 11/1986 | Howng | 73/115 |
| 5,095,741 A | * | 3/1992 | Bartig et al. | 73/115 |
| 5,488,868 A | * | 2/1996 | Ootake et al. | 73/115 |
| 5,559,280 A | * | 9/1996 | Kovacich et al. | 73/35.13 |
| 5,583,295 A | * | 12/1996 | Nagase et al. | 73/115 |

* cited by examiner

Primary Examiner—Eric S. McCall
(74) Attorney, Agent, or Firm—Loren H. Uthoff, Jr.; Roger A. Johnston

(57) ABSTRACT

Transducer housing for mounting in a port in an engine combustion chamber has a metal diaphragm exposed to the combustion gasses. The pressure of the combustion gasses is transferred through an aluminum coupling disc which deflects a simply supported beam member. The beam member is formed of refractory material having epitaxially grown crystalline piezoresistors formed on one surface of the beam member and connected in a bridge circuit and is secured to a ceramic mounting disc. The aluminum coupling disc has a relatively high coefficient of thermal expansion which maintains a preload on the beam member for improved accuracy in spite of the low thermal expansion of the ceramic mounting disc. In an alternate embodiment, an expansion ring made of a material having a relatively high coefficient of thermal expansion is used to support a mounting disc on which the beam member is supported. The high expansion rate of the expansion ring maintains a preload between the beam member and a cup diaphragm by compensating for the relatively low expansion of the ceramic mounting disc.

15 Claims, 5 Drawing Sheets

ENGINE CYLINDER PRESSURE SENSOR WITH THERMAL COMPENSATION ELEMENT

BACKGROUND OF THE INVENTION

1. Field of the Invention

The present invention relates to transducers for sensing the instantaneous pressure in an engine combustion chamber and, more specifically, the present invention relates to transducers for sensing the instantaneous pressure in an engine combustion chamber where an aluminum coupling disc is disposed between a diaphragm and a sensing element to improve performance. In an alternate embodiment, an aluminum expansion ring is adapted to support the sensor element within the transducer body.

2. Description of the Prior Art

Combustion chamber pressure transducers have found particular application in reciprocating internal combustion engines for detecting the pressure history occurring within the combustion chamber especially for detection of combustion anomalies such as detonation or knock, misfire or pre-ignition. Pressure transducers of this type are typically mounted through an aperture in the combustion chamber such as a threaded hole in the engine cylinder head and are employed to produce an electrical signal indicative of real time combustion pressures which is provided to an engine control comparator for use in controlling various engine parameters such as ignition timing, especially for controlling retarding of the ignition spark timing to prevent knocking. Various types of knock sensors which rely on sensing the high frequency vibration of the engine cylinder block have become a critical element in the management of spark ignition timing in internal combustion engines for optimizing efficiency, power and emission.

Heretofore, laboratory knock sensors or transducers for internal combustion engine usage have employed a metal diaphragm exposed to the combustion chamber gasses which moved an intermediate member to provide a force against a sensing element to generate an electrical signal indicative of the combustion pressure on the pressure responsive diaphragm. The prior art required a comparatively long intermediate member to prevent the extreme thermal environment from damaging the sensing element. This resulted in a transducer which did not have the necessary rapid response time to properly track the combustion event due to detonation or knocking and, thus, the transducer was not suitable for providing an electrical signal to the engine control computer for control of ignition timing. The vibration sensing technology used in prior art systems cannot accurately measure the combustion pressure events that occur in an engine combustion chamber and specifically are subject to drift due to thermal transients.

U.S. Pat. No. 5,559,280 the disclosure of which is hereby incorporated by reference, discloses a transducer housing for mounting in a port in a combustion chamber having a metal diaphragm exposed to the combustion gasses. The pressure of the combustion gasses deflects the diaphragm which locally deflects a simply supported beam member. The beam member is formed of refractory material having epitaxially grown crystalline piezoresistors formed on one surface of the beam and connected in a bridge circuit. Noble metal foil leads connect to the piezoresistors to form the bridge and provide attachment pads. The pads are noble metal welded to other noble metal foil pads provided on a ceramic substrate to form a sensor subassembly for mounting adjacent the diaphragm to form a transducer.

It would be desirable to provide a cylinder combustion pressure transducer that exhibits an increased thermal stability for improved sensing accuracy over a wide range of engine operating conditions. The extremely high temperatures of the combustion event introduce extreme temperature gradients and high heat loads to the face and internal parts of the transducer. The high temperature adversely affects the preload applied on the diaphragm and other internal parts on the sensing element resulting in unreliable performance especially during thermal transients.

SUMMARY OF THE INVENTION

The present invention provides a means to improve the thermal stability of a combustion pressure transducer by utilizing a coupling disc having a relatively high rate of thermal expansion relative to the other components in the transducer which is disposed between the sensor diaphragm and the sensing element. The sensing element is mounted on a mounting disc which is supported in a transducer body using a support ring. Thus, during thermal transients especially with increasing temperature, the coupling disc expands faster than the other components to maintain the preload on the sensing element. In an alternate embodiment, an aluminum expansion ring replaces the steel support ring and a prior art cup diaphragm is used to load the sensing element. The expansion ring functions to maintain the preload between the cup diaphragm and the sensing element by expanding and forcing the sensing element upward toward the cup diaphragm under increasing thermal loads.

One provision of the present invention is to provide a combustion pressure transducer having improved thermal operating characteristics.

Another provision of the present invention is to provide a transducer having a diaphragm acting upon, a coupling element having a high coefficient of thermal expansion which in turn acts upon a force sensing element to provide an accurate electrical signal responsive to combustion chamber pressures.

Another provision of the present invention is to provide a simply supported beam having piezoresistors formed thereon for localized deflection by a diaphragm exposed to combustion chamber pressures operating through a coupling element having a high coefficient of thermal expansion to rapidly generate an electrical signal indicative of changes in combustion chamber pressure.

Another provision of the present invention is to provide a combustion pressure transducer having improved thermal characteristics where an aluminum coupling element is used to transfer the deflection of a diaphragm which is exposed to combustion pressures to a piezoresistive sensing element.

Still another provision of the present invention is to provide an expansion ring having a relatively high rate of thermal expansion secured in the body of a combustion pressure transducer to provide support to a sensing element which contacts a diaphragm which is exposed to combustion pressures.

DETAILED DESCRIPTION OF THE PREFERRED EMBODIMENT

Figure 1:
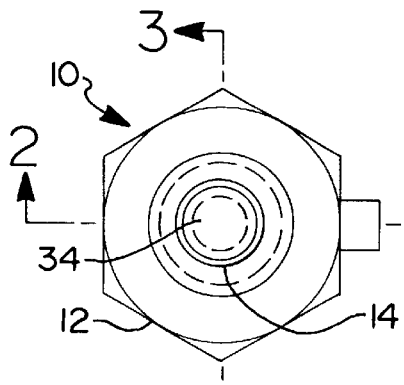
FIG. 1 is an end view of the transducer of the present invention showing the pressure responsive diaphragm installed in the housing.

For purposes of promoting the understanding of the principles of the invention, reference will now be made to the embodiment illustrated in the drawings and specific language will be used to describe the same. It will nevertheless be understood that no limitation on the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from respectively, the geometric center of the apparatus. The terms "upward" and "downward" will refer to directions as taken in the drawings in connection with which the terminology is used. All foregoing terms mentioned above include the normal derivatives and equivalents thereof.

Figure 2:
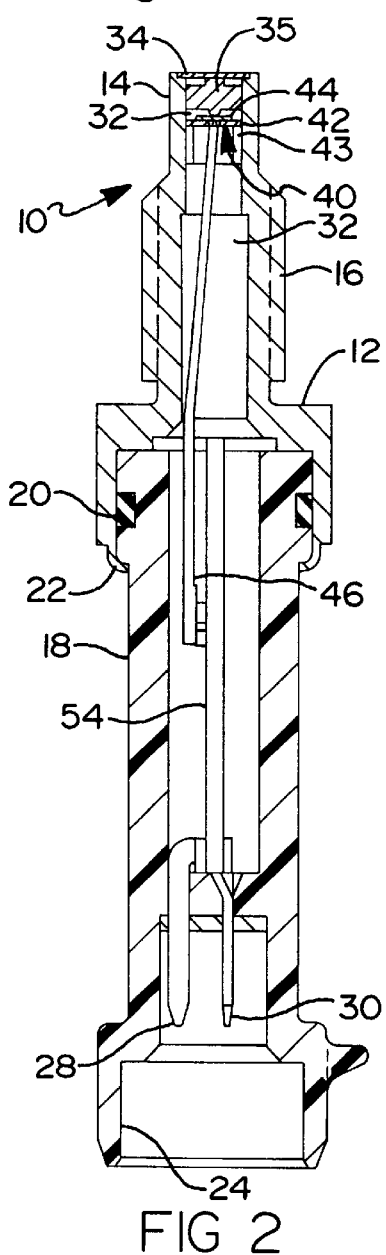
FIG. 2 is a section view taken along section indicating lines 2—2 of FIG. 1.
Figure 3:
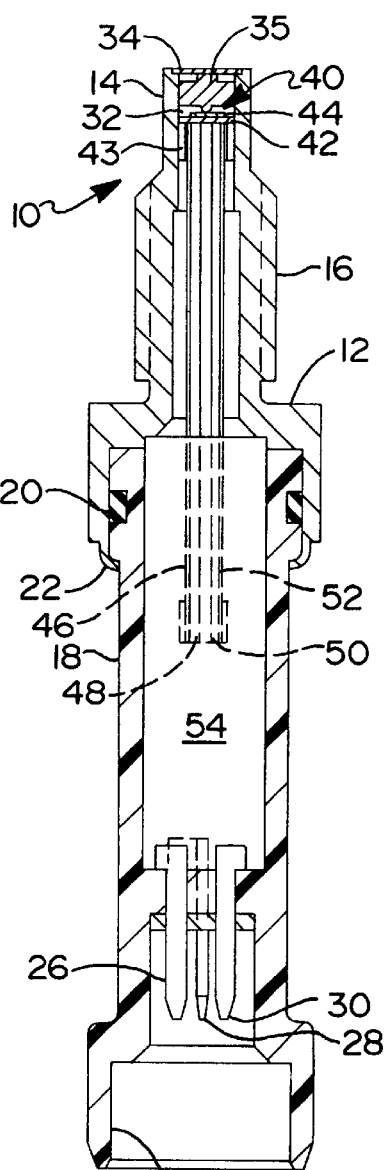
FIG. 3 is a section view taken along section indicating lines 3—3 of FIG. 1 and rotated 90°.

Now referring to FIGS. 1–3, the transducer of the present invention is indicated generally at 10 and has a body 12 which has a reduced diameter portion 14 extending from one end thereof. External threads 16 are formed on the body 12 and are adapted for engaging corresponding threads in an aperture formed in an engine combustion chamber. The body 12 has attached thereto an extension portion 18 which is sealed by a seal ring 20 in the body 12 and retained thereon by any suitable expedient, as for example, crimping a portion of the body 12 as denoted by reference numeral 22. The extension 18 has an electrical receptacle 24 which has provided therein a plurality of connector terminals 26,28,30.

The reduced diameter end 14 of the body 12 has provided a cavity 32 formed in the end thereof. A coupling disc 35, a mounting disc 42 and a support ring 43. The diaphragm 34 is attached to the reduced diameter portion 14 of the body 12 by welding a rather similar attachment technique to provide a high pressure gas sealing between the diaphragm 34 and the body 12. The coupling disc 35 slides within the cavity 32 and provides for a mechanical connection in relaying movement of the diaphragm 34 to the beam member 44 mounted on the mounting disc 42. The mounting disc 42 is secured in position within the cavity 32 by the support ring 43 where the support ring 43 is attached to the inner wall of the cavity 32 formed in the body 12 by an adhesive or other type of suitable attachment means.

FIG. 3 illustrates a cross-sectional view of the transducer 10 where the coupling disc 35 conveys motion of the diaphragm 34 due to pressure fluctuation in a combustion gas to the beam member 44 where the beam member 44 is mounted to the mounting disc 42. Electrical leads 46,48,50 and 52 extend from the mounting disc 42 into the printed circuit board 54 of the transducer 10. A printed circuit board 54 is disposed within the extension 18 and has one end of each of the terminals 26,28,30 attached to circuitry thereon. Each of the leads 46,48,50 and 52 also have one end thereof attached to connectors provided on the printed circuit board 54. The connector terminals 26,28 and 30 are electrically connected to some type of suitable instrumentation and power supply contained therein for electrical power supplied to the transducer 10 and a form of readout device for interpreting the signals generated thereby.

Figure 4:
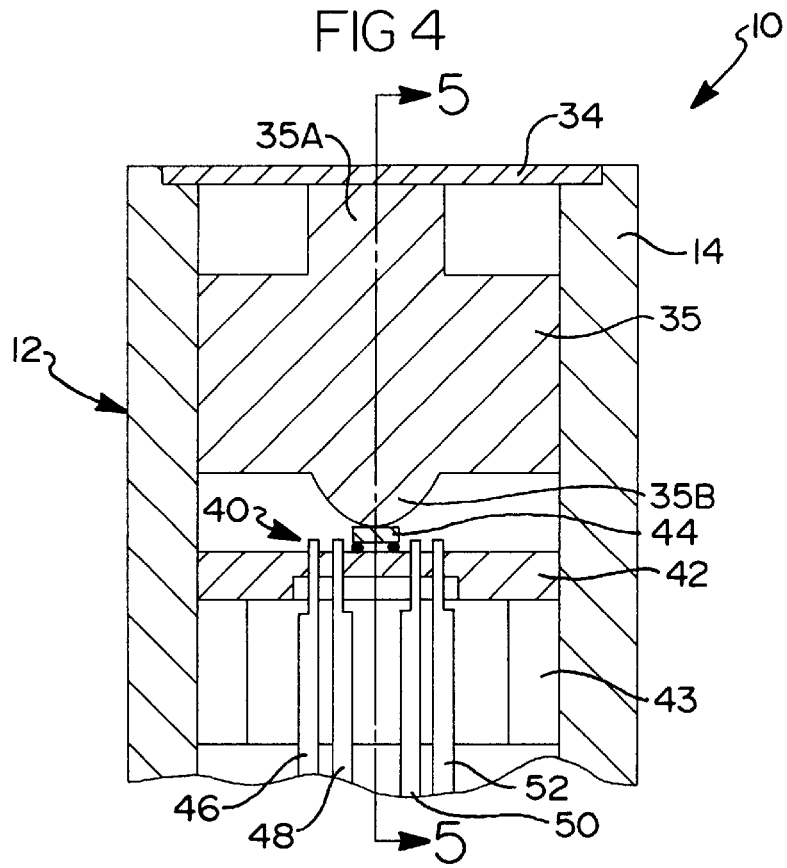
FIG. 4 is an enlarged section view of the upper portion of FIG. 2.
Figure 5:
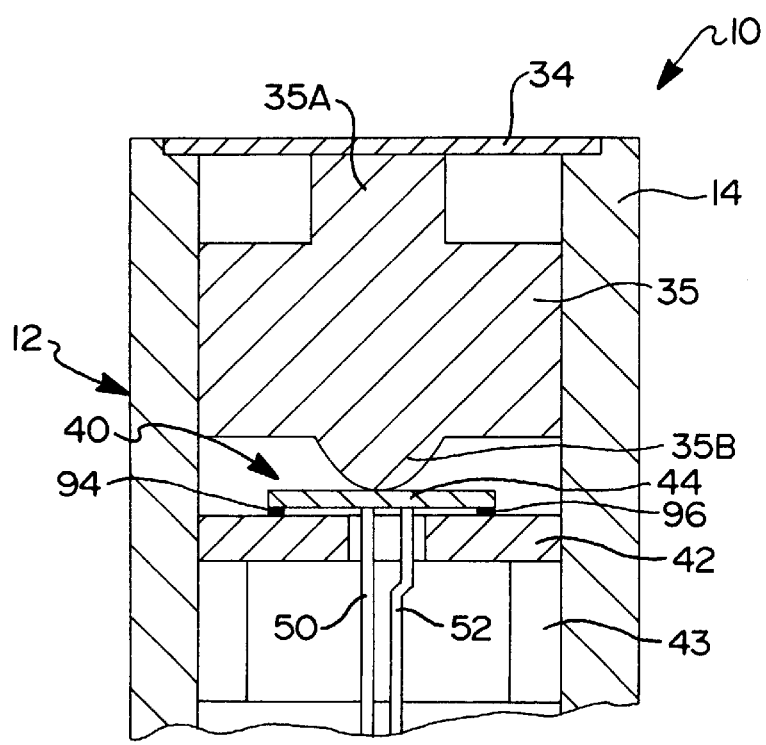
FIG. 5 is a section view taken along section indicating lines 5—5 of FIG. 4.

Referring to FIGS. 4 and 5, FIG. 4 is a cross-sectional view of the beam member 44 supported by mounting disc 42 where the mounting disc 42 is positioned and held on support ring 43. The support ring 43 is preferably made out of a steel material and is welded or otherwise retained to the inner wall of the reduced diameter portion 14 of the transducer body 12 which is also made of a steel material. FIG. 5 is a cross-sectional view of a portion of the transducer 10 of the present invention where the beam member 44 is supported at its ends to the ceramic mounting disc 42. The diaphragm 34 is mounted and sealed to the reduced diameter portion 14 of the transducer body 12 against the coupling disc 35 at the upper extension 35A. The coupling disc 35 is preferably made out of a material with high thermal expansion coefficient such as aluminum and must be effective at mechanically transferring motions of the diaphragm 34 caused by high amplitude pressure fluctuations of the exhaust gas to the beam member 44 or the pressure sensing element 40. The motions of the diaphragm 34 are transferred into the coupling disc 35 at the upper extension 35A. The coupling disc 35 is slidingly supported within the reduced diameter portion 14 of the transducer body 12 allowing for an effective and accurate transfer force from the diaphragm 34 through the coupling disc 35 into the beam member 44 or the pressure sensing element 40 through the lower extension 35B of the coupling disc 35. The purpose of the selection of the material having high thermal expansion for the coupling disc 35 is to improve the accuracy and overall performance of the transducer 10 of the present invention by assuring an adequate preload force on the beam member 44. The higher thermal expansion rate of the aluminum (or any other suitable material with relatively high coefficient of thermal expansion) coupling disc results in more stable preload on the beam member 44 as the thermal load on the transducer 10 increases. Without the coupling disc 35, the transducer 10 of the present invention would display amplitude drift and other measurement inaccuracies especially during the initial startup of the engine due to the difference in the thermal expansion rates of the ceramic mounting disc 42 as compared to the steel diaphragm 34 and body 12.

Figure 6:
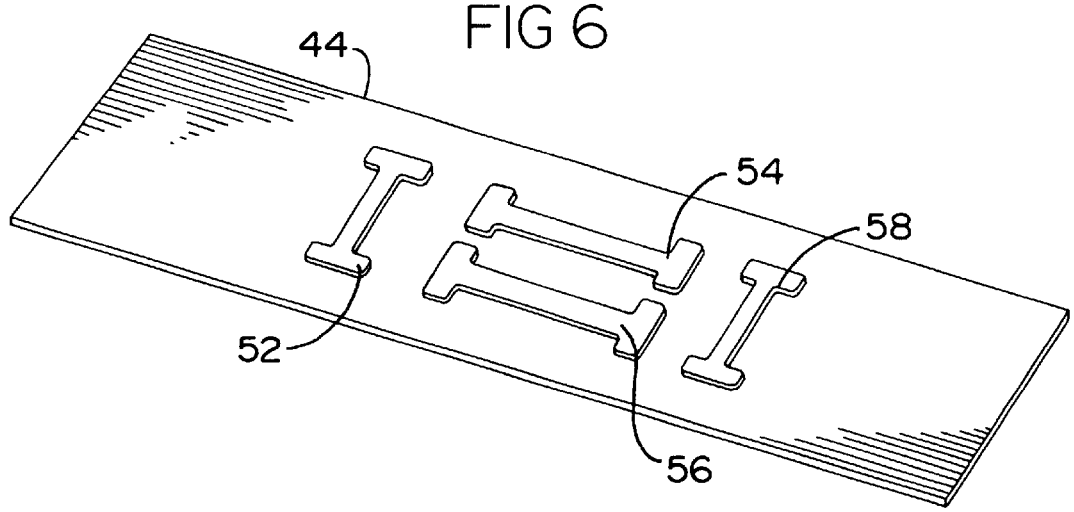
FIG. 6 is an axonometric view of the sensor beam member with the piezoresistors formed thereon.
Figure 7:
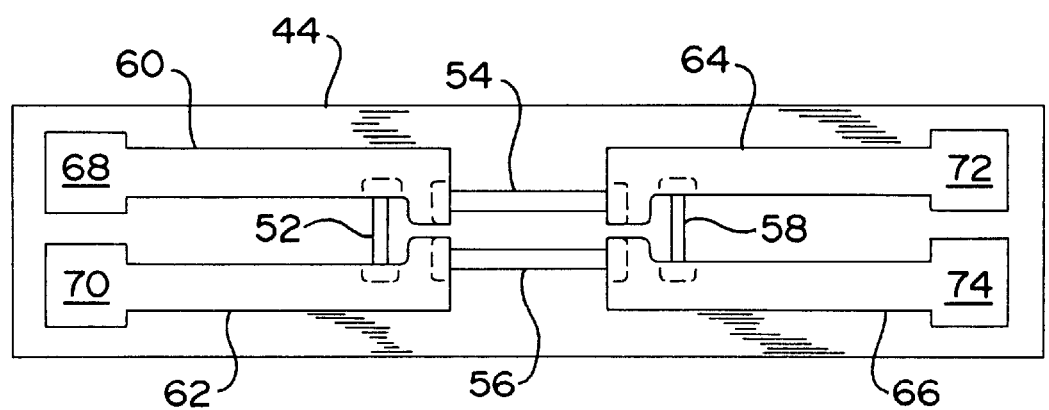
FIG. 7 is a bottom view of the sensor beam member of the present invention.

Now referring to FIGS. 6 and 7, the beam member 44 is shown as formed with the discreet piezoresistor elements 52,54,56,58 formed on one surface or face thereof and shown in FIG. 6 as an upper surface thereof. The piezoresistors are arranged in a pattern whereby two of the elements 52,58 are aligned transversely to the longitudinal dimension of the beam member 44 and the remaining two piezoresistor elements 54,56 are disposed in a space parallel arrangement and aligned with the longitudinal direction of the beam member 44. In the presently preferred practice of the invention, the beam member 44 is formed of crystalline silicone carbide material and the piezoresistive elements 52,54,56,58 are epitaxially grown crystals of doped silicone carbide material both of which may be obtained as a unit from Cree Research, Inc., 2810 Meridian Parkway, Durham, N.C. 27713. It will be understood that the piezoresistor elements 52,54,56 and 58 are formed on the surface of the beam member 44 with an orientation such that the piezoresistor elements 52,54,56 and 58 may be connected into a Wheatstone bridge circuit. Referring now to FIG. 7, the beam member 44 is shown with electrically conductive strips 60,62,64 and 66 layed upon the surface thereof with conductive strip 60 having one end thereof electrically connected to one end of both of the conductive strips 52 and 54. Conductive strip 60 extends along the surface of the beam member 44 to form a connector pad 68 on one end thereof adjacent to the end of the beam member 44. Conductive strip 62 is disposed and generally spaced parallel relationship to the conductive strip 60. Conductive strip 62 has one end thereof electrically interconnecting the opposite end of the piezoresistor element and one end of piezoresistor element 56. Conductive strip 62 extends along the beam member 44 to form an electrical connecting pad 70 at the end thereof remote from the piezoresistive conductive strip 62. Electrically conductive strip 64 is connected to the remaining end of piezoresistive element 54 and also to one end of piezoresistive element 58. Conductive strip 64 extends along beam member 44 to have the end of conductive strip 64 form a conductive pad 72 at the end of the beam member 44 remote from the piezoresistor element 58. Electrically conductive strip 66 has one end thereof electrically connected to the remaining end of piezoresistor element 56 and also the remaining end of piezoresistor element 58. Conductive strip 66 extends along beam member 44 and spaced parallel relationship to conductive strip 64 and has the end thereof remote from piezoresistor element 58 forming an electrical connector pad 74. According to the present invention, the conductive strips 60,62,64 and 66 are formed of gold and may be plated over an oxide layer on the surface of beam member 44. It will be understood that by electrically connecting to the conductive connector pads 68,70,72, 74, the piezoresistor elements 52,54,56 and 58 electrically form Wheatstone bridge and thus can provide an electrical signal indicative of flexure or bending of the beam member 44 driven into such a condition of pressure being applied to the diaphragm 34 and transferred through coupling disc 35 to the pressure sensing element 40 which includes the beam member 44.

Figure 8:
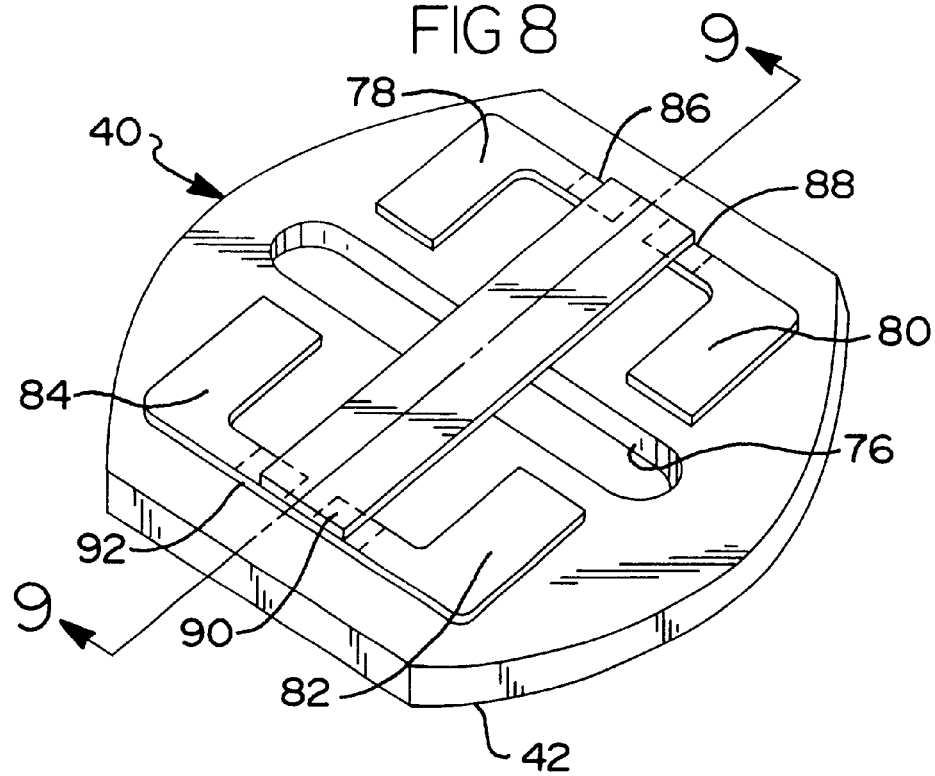
FIG. 8 is an axonometric view of the sensor element of the embodiment of FIG. 1.
Figure 9:
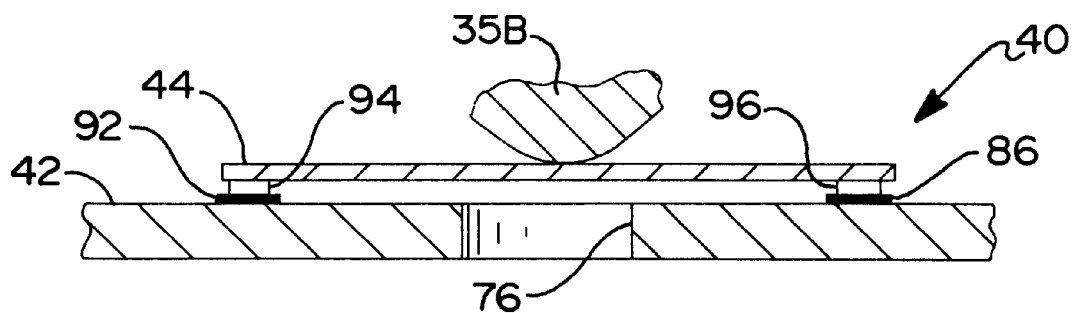
FIG. 9 is a section view taken along section indicating lines 9—9 of FIG. 8.

Referring to FIGS. 8 and 9, the mounting disc 42 is shown as having a central slot 76 formed therethrough with a plurality of electrically conductive thin film strips preferably formed of noble metal provided on the surface thereof. According to the present invention, the substrate mounting disc 42 is formed of refractory or ceramic such as aluminum oxide.

Specifically with reference to FIG. 8, the strips are disposed in quadrature and each have one end thereof of forming an enlargement pad for an attachment thereto denoted by reference numerals 78,80,82 and 84. In the presently preferred practice, the strips and pads are formed of silver material and each has an end portion formed of gold and is noted respectively by reference numerals 86,88,90 and 92.

Now referring to FIG. 9, the beam member 44 of FIG. 7 is shown as placed on to the substrate with noble metal pellet disposed to each corner thereof and contacting one of the connector pads 68,70,72 and 74 on the underside of the beam and also contacting one of the connector pads 78,80,82 and 84 on the mounting disc 42. The beam member 44 in FIG. 9 is subjected to pressure and heating so as to effect bonding of the pellets on the two of which are visible in FIG. 9 and noted by reference numerals 94 and 96 to effect weldment of the connector pads 68,70,72 and 74 on the undersurface of beam member 44 each to respectively one of the gold strips 86,88,90 and 92 on the substrate mounting disc 42. The mounting disc 42 with the beam member 44 attached thereto as shown in FIG. 9 then has the electrical connector strips 60,62,64 and 66 each having one end extending through the slot 76 and attached weldment respectively to one of the connector pads 78,80,82 and 84 on the mounting disc 42 to provide electrical connection between the leads and the Wheatstone bridge circuit formed by the piezoresistor elements 52,54,56 and 58 from the underside beam member 44. The assembly of the sensor element 40 with electrical leads 46,48,50 and 52 is then assembled into the body 12 and the diaphragm member 34 inserted therein with the diaphragm member 34 contacting the coupling disc 35 at the upper extension 35A and the lower extension 35B contacting the center of the beam member 44.

The opposite ends of the electrical leads 46,48,50 and 52 are then connected to the printed circuit board which may be inserted into the extension portion 18 which may then be crimped onto the body 12. It will be understood that the transducer 10 of the present invention provides direct contact of the piezoresistor elements 52,54,56 and 58 with the underside of the diaphragm 34 which has its opposite side exposed to the combustion pressures and temperature combustion chamber gases through the coupling disc 35 which is made up of a thermally conductive material. The refractory material of the beam member 44 is able to withstand the temperatures of the diaphragm 34 where the diaphragm is heated by the combustion chamber gases and such temperatures are conducted into the beam member 44 through the coupling disc 35. The direct deflection of beam member 44 with the piezoresistor elements 52,54,56 and 58 thereon by the coupling disc 35 in response to motion of the diaphragm 34 thus eliminates intermediate linkages and improves the accuracy and response time of the present transducer especially due to thermal drift.

Figure 10:
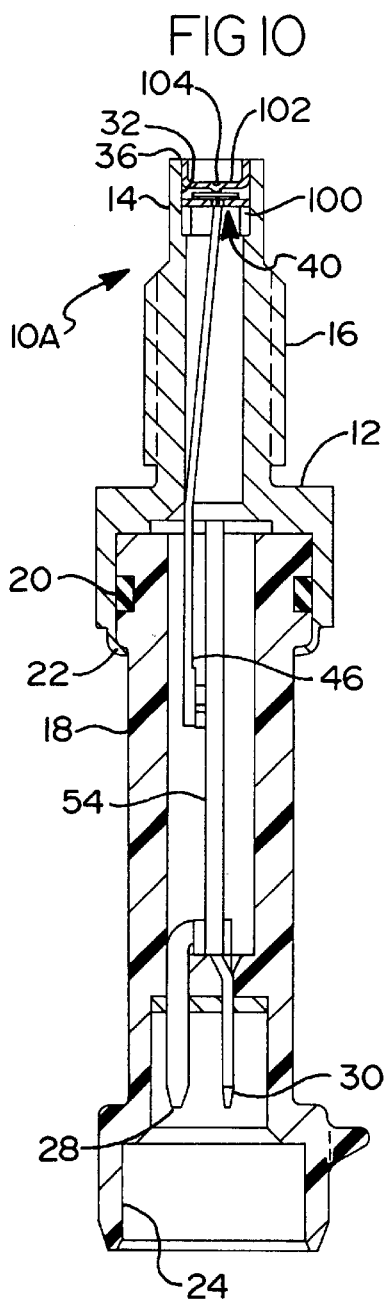
FIG. 10 is a section view alternate embodiment of the transducer of the present invention.

Now referring to FIG. 10, an alternate embodiment of the trandsucer 10 of the present invention is shown, where an expansion ring 100 made of a material having a high coefficient of expansion is used to support the mounting disc 42 of the sensor element 40. The expansion ring 100 is retained within the reduced diameter portion 14 of the body 12 of the transducer 10. A cup diaphragm 102 is secured within the reduced diameter portion 14 and is positioned to contact the sensor element 40 at the beam member 44 which is attached to and supported by the ceramic mounting disc 42. The ceramic mounting disc 42 sits upon a expansion ring 100. As the combustion pressures and temperatures rise, it is possible for the difference in the expansion coefficients of the various materials, specifically the transducer body 12 made out of steel and the support mounting disc 42 made out of a ceramic material and the cup diaphragm 102 made out of a steel material, to change in dimension resulting in a loss of preload and contact of the cup diaphragm 102 against the beam member 44 thereby providing for measurement inaccuracy and drift. According to the present invention, the expansion ring 100 is made of material having a high thermal coefficient expansion such as aluminum which expands at a greater rate than the steel material of the transducer body 12 or the cup diaphragm 102 and thereby forces the mounting disc 42 upward towards the cup diaphragm 102 thereby maintaining the preload of the cup diaphragm 102 on the beam member 44.

Figure 11:
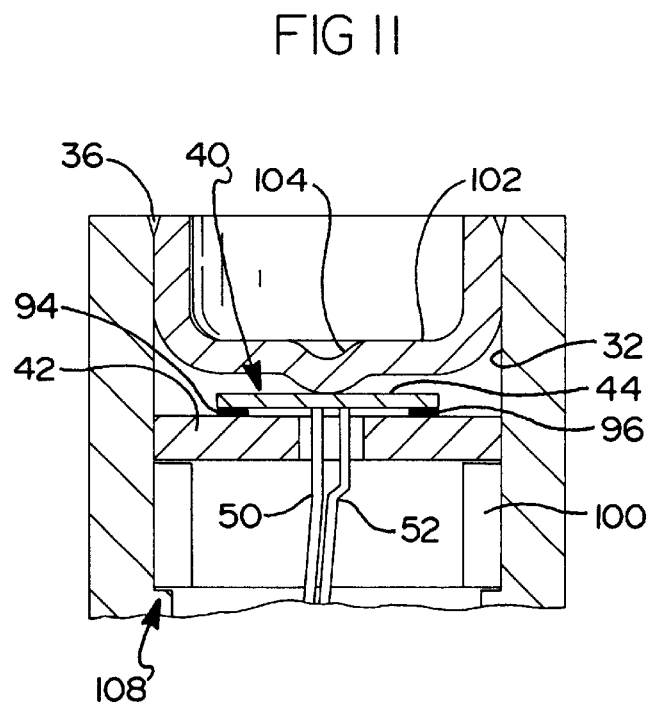
FIG. 11 is an enlarged section view of the upper portion of FIG. 10.

Now referring to FIG. 11, a cross-sectional view section of the alternate embodiment of the transducer 10A is shown where the cup diaphragm 102 is retained within the reduced diameter portion 14 of the transducer body 12 by welding or other suitable means to seal the beam member 44 from the combustion gases. The beam member 44 is secured to the ceramic mounting disc 42 by the pellets 94 and 96. The cup diaphragm 102,has a dimpled portion 104 which extends downward to contact the beam member 44 and transfers the combustion pressure loads directly to the beam member 44. The ceramic mounting disc 42 is supported within the transducer body 12 by the expansion ring 100 which is made of a material having a high coefficient of thermal expansion to maintain a preload force on the beam member 44.

Expansion ring 100 is slip fit into the reduced diameter portion and is free to expand within the transducer body 12 due to thermal changes. The top edge of the expansion ring 100 contacts the mounting disc 42 and the bottom edge contacts and is supported by a ledge 108 formed in the transducer body 12. In this manner, the expansion ring 100 serves to maintain the preload created between the cup diaphragm 102 and the beam member 44 by expanding faster than the steel transducer body 12 and forcing the mounting disc 42 upward toward the cup diaphragm 102.

This alternate embodiment is relatively slow in making adjustments in the preload on the beam member 44 as compared to the preferred embodiment shown in FIGS. 1–5. In the preferred embodiment, the heat flow through the diaphragm 34 travels directly into the coupling disc 35 which expands and makes a rapid preload adjustment. In the alternate embodiment shown in FIGS. 10 and 11, the heat must first flow through a portion of the steel transducer body 12 before the expansion ring 100 is heated and starts to expand. This creates a time lag and the transient thermal response of the alternate embodiment transducer 10A is slower than that of the preferred embodiment.

This invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

We claim:

1. A combustion chamber pressure transducer comprising:
   a body adapted for mounting in a sensing port in a combustion chamber and defining a cavity therein;
   a resilient pressure responsive diaphragm closing an opening of said cavity and formed of material capable of withstanding the temperatures and pressures of said combustion chamber;
   a coupling disc formed of a material having a relatively high coefficient of thermal expansion with respect to said body slidingly supported within said cavity and having an upper extension and a lower extension, said upper extension contacting said diaphragm; and
   a beam member made of piezoresistive material supported within said cavity with a portion of said beam member contacting said lower extension of said coupling disc, said beam member being electrically responsive to combustion pressure induced movement of said diaphragm transferred through said coupling disc, with said lower extension being operative for effecting a bending of said beam thereby generating an electrical signal in response to said bending.

2. The combustion chamber pressure transducer of claim 1, further comprising a mounting disc supported in said cavity for supporting said beam member.

3. The combustion chamber pressure transducer of claim 2, further comprising a support ring secured within said cavity and contacting said mounting disc.

4. The combustion chamber pressure transducer of claims 2 or 3, wherein said beam member is supported at its ends on said mounting disc.

5. The combustion chamber pressure transducer of claim 2, wherein said mounting disc is formed from a ceramic material.

6. The combustion chamber pressure transducer of claim 5, further comprising silicon carbide piezoresistors formed on said beam member.

7. The combustion chamber pressure transducer of claim 1, wherein said coupling disc is made of aluminum.

8. A combustion chamber pressure transducer comprising:
   a body adapted for mounting in a sensing port in a combustion chamber and defining a cavity therein;
   a resilient pressure responsive diaphragm closing said cavity and formed of material capable of withstanding the temperatures and pressures of said combustion chamber;
   a beam member made of piezoresistive material disposed within said cavity with a certain portion of said diaphragm contacting said coupling disc;
   a mounting disc having a first face contacting said beam member and a second face opposite from said first face; and
   an expansion ring formed of a material having a relatively high coefficient of thermal expansion relative to said body confined within said cavity and contacting said second face of said mounting disc.

9. The combustion chamber pressure transducer of claim 8, wherein said expansion ring is formed from aluminum.

10. The combustion chamber pressure transducer of claim 8, wherein said beam member is supported at its ends on said mounting disc.

11. The combustion chamber pressure transducer of claim 8, wherein said mounting disc is formed of a ceramic material.

12. The combustion chamber pressure transducer of claim 8, wherein said diaphragm comprises a cup-shaped metal member.

13. The combustion chamber pressure transducer of claim 8, wherein said diaphragm comprises a cup-shaped metal member and said certain diaphragm portion includes a dimpled portion formed in said cup-shaped member.

14. The combustion chamber pressure transducer of claim 8, wherein said beam member is simply supported at its ends and said end supports are electrically conductive.

15. The combustion chamber pressure transducer of claim 8, further comprising silicon carbide piezoresistors formed on said beam member.

* * * * *